(12) United States Patent
Grokop et al.

(10) Patent No.: US 9,794,736 B2
(45) Date of Patent: Oct. 17, 2017

(54) LOW POWER ALWAYS-ON DETERMINATION OF INDOOR VERSUS OUTDOOR STATE

(71) Applicant: QUALCOMM Incorporated, San Diego, CA (US)

(72) Inventors: Leonard Henry Grokop, San Diego, CA (US); Shankar Sadasivam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 13/725,753

(22) Filed: Dec. 21, 2012

(65) Prior Publication Data

US 2014/0179298 A1 Jun. 26, 2014

(51) Int. Cl.
*H04W 4/02* (2009.01)
*G01S 19/48* (2010.01)
(Continued)

(52) U.S. Cl.
CPC .............. *H04W 4/02* (2013.01); *G01S 19/34* (2013.01); *G01S 19/48* (2013.01);
(Continued)

(58) Field of Classification Search
CPC .......... G01S 19/48; G01S 19/34; H04W 4/02; H04W 4/043; H04W 52/0225; H04W 40/20; H04W 4/001
See application file for complete search history.

(56) References Cited

U.S. PATENT DOCUMENTS 7,421,276 B2   9/2008   Steer et al.
8,161,299 B2   4/2012   Karkaria et al.
(Continued)

FOREIGN PATENT DOCUMENTS

EP   1884753 A1   2/2008
EP   2453262 A2   5/2012
(Continued)

OTHER PUBLICATIONS

International Search Report and Written Opinion—PCT/US2013/070865—ISAEPO—Apr. 11, 2014.
(Continued)

*Primary Examiner* — Liton Miah
(74) *Attorney, Agent, or Firm* — Kilpatrick Townsend & Stockton/Qualcomm

(57) ABSTRACT

Methods, systems, computer-readable media, and apparatuses for determining indoor/outdoor state of a mobile device are presented. In some embodiments, a mobile device may maintain an indoor/outdoor state. The mobile device may include at least one first sensor and at least one second sensor, the first sensor associated with higher power consumption than the second sensor. The mobile device may gate off the first sensor and using the second sensor to obtain a sensor reading, if the second sensor can generate a reading indicative of the indoor/outdoor state of the mobile device. The mobile device may use the first sensor to obtain a sensor reading, if the second sensor cannot generate a reading indicative of the indoor/outdoor state of the mobile device. The mobile device may update the indoor/outdoor state of the mobile device based on a reading received from one of the first and the second sensors.

53 Claims, 6 Drawing Sheets

Mobile Device

(51) Int. Cl.
*G01S 19/34* (2010.01)
*H04W 52/02* (2009.01)

(52) U.S. Cl.
CPC .... *H04W 52/0254* (2013.01); *H04M 2250/10* (2013.01); *H04M 2250/12* (2013.01); *Y02B 60/50* (2013.01)

(56) References Cited

U.S. PATENT DOCUMENTS

| | | | |
|---|---|---|---|
| 9,055,396 B2* | 6/2015 | Keerthi | G01S 5/0215 |
| 9,285,484 B2* | 3/2016 | Shima | G01S 19/14 |
| 2007/0239813 A1 | 10/2007 | Pinder et al. | |
| 2010/0187406 A1 | 7/2010 | Van Dalen et al. | |
| 2011/0300875 A1 | 12/2011 | Kim et al. | |
| 2012/0052872 A1 | 3/2012 | Do | |
| 2012/0203491 A1 | 8/2012 | Sun et al. | |
| 2012/0252425 A1 | 10/2012 | Moeglein et al. | |
| 2012/0252495 A1* | 10/2012 | Moeglein | G01S 19/26 455/456.3 |
| 2013/0083216 A1* | 4/2013 | Jiang | H04N 9/735 348/223.1 |
| 2013/0131973 A1* | 5/2013 | Friedler et al. | 701/409 |
| 2013/0157638 A1* | 6/2013 | Malmbak et al. | 455/418 |
| 2014/0002307 A1* | 1/2014 | Mole et al. | 342/451 |

FOREIGN PATENT DOCUMENTS

| | | |
|---|---|---|
| JP | 2001103002 A | 4/2001 |
| JP | 2005168041 A | 6/2005 |
| JP | 2008039565 A | 2/2008 |
| JP | 2008117424 A | 5/2008 |
| JP | 2010014640 A | 1/2010 |
| JP | 2012103138 A | 5/2012 |
| WO | 2007102479 A1 | 9/2007 |

OTHER PUBLICATIONS

Welbourne E., et al, "Mobile Context Inference Using Low-Cost Sensors", Lecture Notes in COmputer Science, 2005, 11pgs.

* cited by examiner

LOW POWER ALWAYS-ON DETERMINATION OF INDOOR VERSUS OUTDOOR STATE

BACKGROUND

Aspects of the disclosure relate to computing technologies, including computer software and computer hardware. In particular, various aspects of the disclosure relate to using one or more sensors to determine the indoor or outdoor state of a mobile device. Context-aware computing can be utilized in a mobile device to determine the indoor/outdoor state.

Personal computing devices, such as mobile phones, tablet computers and laptop computer are becoming increasingly popular. In addition, a number of software applications and other functionalities that can be provided on a computing device can use indoor/outdoor state information to further enhance a user's experience when using such a device.

For example, using indoor/outdoor state information can facilitates a range of applications, such as: gating power-draining location determination (e.g., Global Positioning System (GPS) fixes); gating power-draining search for wireless local area network (WLAN); triggering or disabling on-device indoor navigation systems; and feeding situational awareness information (e.g., user is on the street, bus, subway) to other applications.

In some instances, however, a device might not know its current indoor/outdoor state, and/or might lack certain specialized hardware, software, reference information, and/or other resources that could be used in determining the current indoor/outdoor state of the device.

One way of overcoming these issues is to have such a device use power-intensive sensors (e.g., GPS, camera, Bluetooth, GPS, WLAN) to observe information at its current location, and then use this information with substantial post-processing of the sensor data in order to make an accurate indoor/outdoor state determination. For example, a conventional method to determine indoor/outdoor state is for the device to simultaneously use multiple high power sensors (e.g., GPS, WLAN, camera, motion information), and make a determination based on all the sensor data. Another example of a conventional method includes using a GPS fix over time and determining the indoor/outdoor state based on the visibility of satellites. However, conventional methods are very power intensive and therefore cannot be on an always-on mode. Additionally, conventional methods may not make accurate determination of the indoor/outdoor state.

BRIEF SUMMARY

Methods, systems, computer-readable media, and apparatuses for determining indoor/outdoor state of a mobile device are presented. Certain embodiments are described that relate to using one or more sensors to accurately determine the indoor/outdoor state of a device in an always-on mode.

This is the summary describes the features and elements that allow a device to make a low power always-on determination of its indoor/outdoor state.

In some embodiments, a mobile device may maintain an indoor/outdoor state. The mobile device may include at least one first sensor and at least one second sensor, the first sensor associated with higher power consumption than the second sensor. The mobile device may gate off the first sensor and using the second sensor to obtain a sensor reading, if the second sensor can generate a reading indicative of the indoor/outdoor state of the mobile device. The mobile device may use the first sensor to obtain a sensor reading, if the second sensor cannot generate a reading indicative of the indoor/outdoor state of the mobile device. The mobile device may update the indoor/outdoor state of the mobile device based on a reading received from the first and/or the second sensors.

In some embodiments, a mobile device may comprise of one or more processors for determining indoor/outdoor state of the mobile device and memory storing computer-readable instructions that, when executed by the one or more processors, cause the mobile device to: maintain an indoor/outdoor state of the mobile device, wherein the indoor/outdoor state is selected from a plurality of possible states including an indoor state and an outdoor state; wherein the mobile device includes at least one first sensor and at least one second sensor, the at least one first sensor associated with higher power consumption than the at least one second sensor; gate off the at least one first sensor and use the at least one second sensor to obtain a sensor reading, if the at least one second sensor can generate a reading indicative of the indoor/outdoor state of the mobile device; use the at least one first sensor to obtain a sensor reading, if the second sensor cannot generate a reading indicative of the indoor/outdoor state of the mobile device; and update the indoor/outdoor state of the mobile device based on a reading received from one of the at least one first and at least one second sensors.

In some embodiments, one or more computer-readable media storing computer-executable instructions that, when executed, cause one or more computing device included in a mobile device to: maintain an indoor/outdoor state of the mobile device, wherein the indoor/outdoor state is selected from a plurality of possible states including an indoor state and an outdoor state; wherein the mobile device includes at least one first sensor and at least one second sensor, the at least one first sensor associated with higher power consumption than the at least one second sensor; gate off the at least one first sensor and use the at least one second sensor to obtain a sensor reading, if the at least one second sensor can generate a reading indicative of the indoor/outdoor state of the mobile device; use the at least one first sensor to obtain a sensor reading, if the second sensor cannot generate a reading indicative of the indoor/outdoor state of the mobile device; and update the indoor/outdoor state of the mobile device based on a reading received from one of the at least one first and at least one second sensors.

In some embodiments, an apparatus for determining indoor/outdoor state of a mobile device may comprise: a means for maintaining an indoor/outdoor state of the mobile device, wherein the indoor/outdoor state is selected from a plurality of possible states including an indoor state and an outdoor state; wherein the mobile device include at least one first sensor and at least one second sensor, the at least one first sensor associated with higher power consumption than the at least one second sensor; a means for gating off the at least one first sensor and using the at least one second sensor to obtain a sensor reading, if the at least one second sensor can generate a reading indicative of the indoor/outdoor state of the mobile device; a means for using the at least one first sensor to obtain a sensor reading, if the second sensor cannot generate a reading indicative of the indoor/outdoor state of the mobile device; and a means for updating the indoor/outdoor state of the mobile device based on a reading received from one of the at least one first and at least one second sensors.

In one or more arrangements, the mobile device may use a timer to periodically check the at least one second sensor, wherein the at least one second sensor comprises a motion detector. Furthermore, the mobile device may determine whether movement has occurred based on periodic checking the motion detector and use a reading from the at least one first sensor to update the indoor/outdoor state of the mobile device, if movement has been determined to have occurred.

In one or more arrangements, wherein the at least one second sensor comprises an ambient light sensor (ALS), wherein the at least one first sensor comprises a camera, the mobile device may use the camera to generate the reading indicative of the indoor/outdoor state of the mobile device only if a reading from the ALS is above a second predetermined value.

In one or more arrangements, the mobile device may capture a camera image from the camera, wherein the camera image includes a red, green and blue (RGB) value for each pixel in the camera image. Furthermore, the mobile device may generate the reading indicative of the indoor/outdoor state of the mobile device based on computing the RGB value of pixels in the camera image.

BRIEF DESCRIPTION OF THE DRAWINGS

Aspects of the disclosure are illustrated by way of example. In the accompanying figures, like reference numbers indicate similar elements, and.

DETAILED DESCRIPTION

Figure 1:
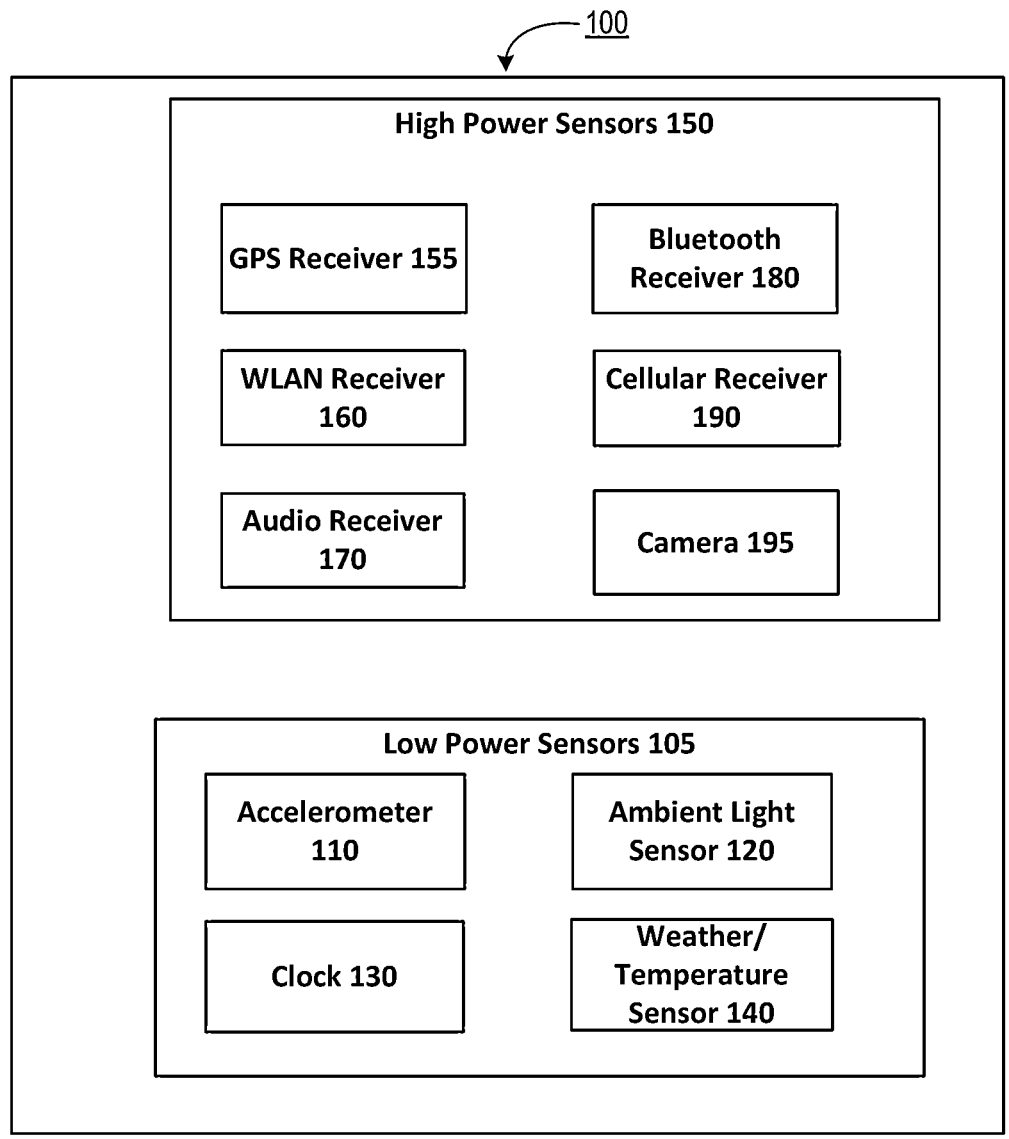
FIG. 1 illustrates a simplified diagram of a mobile device system that may incorporate one or more embodiments of the present invention.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Aspect of the disclosure relate to indoor or outdoor determination using sensor data from a mobile device. Certain embodiments are described using different high and low power sensors for determining whether the device is indoors or outdoors. This may enable the device to make an accurate low power always-on determination of its indoor/outdoor state. High power sensors 150 can include, but are not limited to, GPS receiver 155, WLAN receiver 160, audio receiver 170, Bluetooth receiver 180, cellular receiver 190 and camera 195. Low power sensors 105 can include, but are not limited to, accelerometer 110, ambient light sensor (ALS) 120, clock 130 and weather/temperature sensor 140.

While conventional systems may provide indoor/outdoor position information, these systems rely on power-intensive sensors that cannot be implemented in a low power always-on mode. By using low power sensors to make the indoor/outdoor state determination and/or gate the use of high power sensors, in accordance with various aspects of the disclosure, embodiments of the present invention allow for a low power always-on determination of the indoor/outdoor state of the device.

According to some embodiments, always-on low power sensors can be used to determine the indoor/outdoor state of the device. However, if the low power sensors 105 cannot generate a reading indicative of the indoor/outdoor state, then the system can utilize high power sensors 150.

Various embodiments will now be discussed in greater detail with reference to the accompanying figures, beginning with FIG. 1.

Low Power Sensors

FIG. 1 illustrates a simplified diagram of a mobile device system 100 that may incorporate one or more embodiments of the present invention. System 100 comprises, among other components, low power sensors 105 and high power sensors 150. Low power sensors 105 may include, for example, accelerometer 110, ambient light sensor 120, clock 130, and weather/temperature sensor 140. High power sensors may include, for example, GPS receiver 155, WLAN receiver 160, audio receiver 170, Bluetooth receiver 180, cellular receiver 190, and camera 195. According to some embodiments, the system can use low power sensors 105 in an always-on fashion to help the system determine the indoor/outdoor state. Additionally the low power sensors 105 can be used as a gating mechanism to the high power sensors 150.

According to some embodiments, the system 100 can use an accelerometer 110 to help the system 100 determine the indoor/outdoor state. Additionally the accelerometer 110 can be used as a gating mechanism to the high power sensors 150. Using an accelerometer 110, a user's motion type can be computed in a low-power always-on mode.

For example, if the accelerometer 110 reveals that the user is driving, the system can infer that the user is outdoors. Alternatively, if the accelerometer 110 determines that the system 100 has not moved since the last timer expiration, the system 110 can use this information to gate the use of the high power sensors 150 in order to preserve battery power.

Furthermore, in FIG. 1, the system 100 can use an ALS 120 to determine the indoor/outdoor state. Additionally, the system 100 can use an ALS 120 as a gating mechanism to the high power sensors 150. For example, the range of lux (i.e., light intensity) values observed outdoors is typically far greater than the range of lux values observed indoors. Therefore, if the ALS outputs a very high reading (e.g., high_threshold=500 lux), then the system can assume that the device is outdoors. Alternatively, for example, if the ALS reading is low (e.g., in step 260 where low_threshold=5 lux), the system can assume that the device is concealed and gate the use of the camera 195. The system can utilize any ALS 120 available on the device (e.g., an ALS may be present on the front and/or back of the device).

During daylight the lux value for outdoor environments can range from as low as 500 up to 20,000. It can be assumed that the light intensity in an indoor environment is not going to be brighter than 500 lux. Therefore, the system can use the ALS reading when it is greater than a certain high value threshold (e.g., 500 lux), as a clear delineation between outdoor and indoor environments. Thus if the device is outdoors and not concealed, a high lux value can be an easy determination that the device is outdoors and the state can be set to outdoors.

For example, if the light intensity from the ALS has a lux value less than 5, then the system can assume that the device is concealed and not to initiate the camera. In addition, the system can use the ALS to instantly determine that the device is outdoors, when the ALS returns a value greater than high_threshold. For example, if the light intensity from the ALS has a lux value greater than 500, then the system can assume that the device is outdoors. Furthermore, the low_threshold and high_threshold values can have default values, but these values are also configurable by the system 100 and/or user.

According to some embodiments, the system illustrated in FIG. 1 can include a clock 130 to help determine the indoor/outdoor state. Additionally, the system 100 can use the clock 130 as a gating mechanism to the high power sensors 150. For example, using the time of day, the system 100 can inferred that users are more likely to be indoors at certain times of the day (e.g., late at night). Additionally, the clock can be used by the system 100 to gate the use of the camera 195 during non-daylight hours.

According to some embodiments, the system 100 illustrated in FIG. 1 can include a weather/temperature sensor 140 for weather and/or temperature readings. These readings can be used to determine the indoor/outdoor state of the system 100. For example, it can be inferred that users are more likely to be indoors during certain situation (e.g., cold, rain, snow). The weather/temperature sensor 140 can be a physical sensor on the system 100 for readings around the physical environment of the device. Alternatively, the weather/temperature sensor 140 can be linked to external data (e.g., weather forecasting website via the internet).

Thus, the system 100 can use the readings from these low power sensors 105 to determine the indoor/outdoor state of the system 100. Given that these sensors use minimum power, one or more low-power sensors 105 can be implement in an always-on mode without excessively draining the battery of the device. Additionally, if the system 100 cannot determine the indoor/outdoor state of the device with only these low power sensors 105, the system can trigger the use of high power sensors 150 to determine the indoor/outdoor state.

High Power Sensors

Unlike the low power sensors 105, the high power sensors 150 of the system 100, cannot be always on because it can excessively drain the battery of the device. Therefore, according to some embodiments, the system 100 can use the always-on low power sensors 105 as a gating mechanism to turn on these high power sensors 150.

In some embodiments, the system 100 illustrated in FIG. 1 can include a high power sensors 150 or receivers to monitor the radio environment (e.g., GPS, Global System for Mobile Communications (GSM) network, a Universal Mobile Telecommunications System (UMTS), Wireless Local Area Network (WLAN)) and can use the monitored data to determine an indoor/outdoor state for the mobile device.

For example, the system 100 illustrated in FIG. 1 can use a GPS receiver 155 to help determine the indoor/outdoor state. In some instances, the number of visible satellites and their received signal strength indicator (RSSI) can give an indication as to whether the device is indoors or outdoors. For example, a strong RSSI can infer that the device is outdoors. The system may, optionally, also receive or derive Global Navigation Satellite System (GNSS) readings. However, inaccurate determinations can occur if the device is inside near a window on the top of floor of a building, or outside in an urban canyon. Therefore, the system 100 can use the GPS 155 readings as a factor during the indoor/outdoor state determination (e.g., step 230).

According to some embodiments, the system 100 can use a WLAN receiver 160 to monitor signals at unlicensed frequencies. The WLAN receiver 160 can be used by the system 100 to determine the indoor/outdoor state of the device. In some instances, the number of visible Access Points (APs) and their RSSI can gives an indication as to whether the device is indoors or outdoors. For example, seeing few APs or no APs with strong RSSI is an indication that the user is outdoors.

Additionally, the system 100 illustrated in FIG. 1 can include an audio receiver 170. According to some embodiments, the system 100 can use audio data from the audio receiver 170 to determine the indoor/outdoor state of the device. For example, target sound detection can be performed on audio data captured by an audio sensor (e.g., microphone) to determine whether the user is indoors or outdoors. Such a system can be trained via examples using machine learning approaches, to distinguish between indoor and outdoor audio environments. Additionally, measuring reverberation in the audio signal (i.e. delay spread) can contribute toward the indoor/outdoor determination (e.g., step 230).

Furthermore, according to some embodiments, the system 100 illustrated in FIG. 1 can include a Bluetooth receiver 180. The system 100 can monitor Bluetooth signals using the Bluetooth receiver 180 to determine the indoor/outdoor state of the device. In some instances, the system 100 can use Bluetooth scans to determine the device classes of proximate devices. For example, identifying the presence of a stationary device (e.g. desktop computer, printer) can be an indication that the user is indoors. Alternatively, linking to the Bluetooth of a vehicle can be an indication that the device is outdoors.

Moreover, according to some embodiments, the system 100 illustrated in FIG. 1 can include a cellular receiver 190. The system 100 can monitor cellular signals (e.g., GSM, UMTS, Long Term Evolution (LTE), Code Division Multiple Access (CDMA)) to determine indoor/outdoor state of the device. In some instances, the RSSI measurements, time of arrival (TOA) measurements, time difference of arrival (TDOA) measurements, angle of arrival (AOA) measurements, round trip time (RTT) measurements, and/or other measurements (e.g., pilot $E_c/N_o$) can gives an indication as to whether the device is indoors or outdoors. For example, if the measurement indicates that user is moving fast (e.g., greater than 10 km/h), the system can infer that the user is outside. In another example, when the signal strength is weak (e.g., low RSSI measurement) in an area with good cellular coverage, the system 100 can assume that the user is inside a building.

Figure 3:
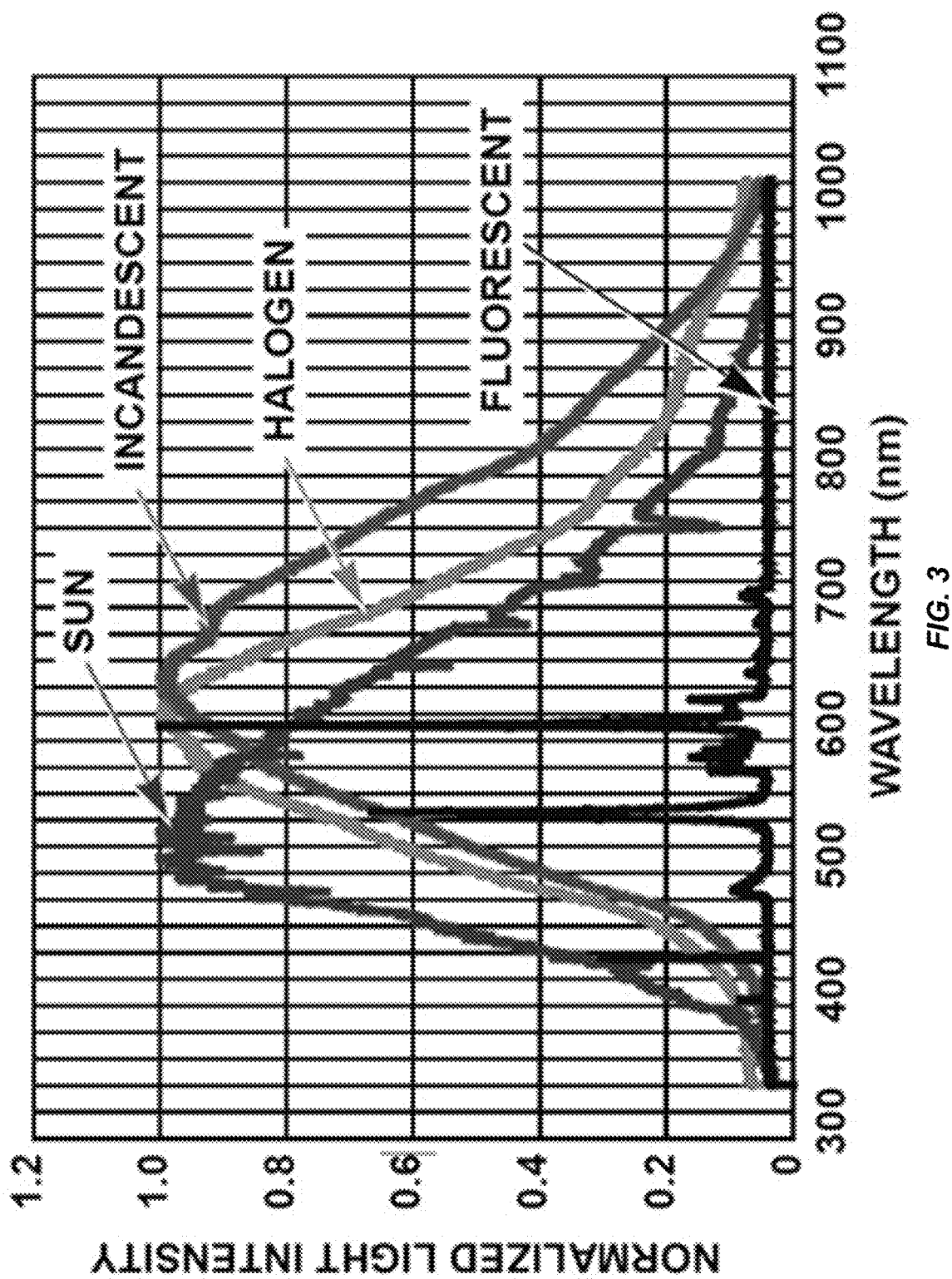
FIG. 3 illustrates a chart for the color spectrum of the light according to the type of light.

In some embodiments, the system 100 illustrated in FIG. 1 can use a camera 195 to determine the indoor/outdoor state of the device. The system 100 can utilize any camera 195 available on the device (e.g., front camera, back camera). For example, as illustrated in FIG. 3, the color analysis of an image capture by a camera 195 can give an indication of the type of light present (e.g. sunlight, florescent). Therefore, using the type of light present, the system 100 can determine whether the device is indoors or outdoors accurately. In some instances, the indoor/outdoor state determination based on data from a camera 195 is very accurate that there is no unknown 235 state outcome.

However, it may be prohibitively power intensive for the system 100 to take images using the camera and perform image-based indoor/outdoor determination continuously or for a prolonged period of time. Therefore the system 100 has mechanisms to gate camera use when it is deemed unnecessary. According to some embodiments, the ALS 120 ensures that the device is not concealed (e.g., step 260) and the accelerometer 110 ensures that sufficient movement has occurred (e.g., step 270) before the camera is engaged.

As illustrated in FIG. 3, the color of the light can be indicative of whether the device is indoors or outdoors. The spectrum of light can be captured by using the camera 195 to take a picture. Color of the light can be determined by using the relative intensities of the red, green and blue (RGB) components of light. By computing the RGB intensities averaged over all the pixels, the color of the light can be assessed. FIG. 3 illustrates the variation in light intensity in comparison of wavelength for different light source. Therefore, in some instances, when a camera 195 captures the spectrum of the light, the system 100 can determine the type of light (e.g., fluorescent, halogen, incandescent, sun) based on, for example, the comparison chart illustrated in FIG. 3.

Furthermore, FIG. 3 illustrates that the color spectrum of the light can map to the type of light, which can be used to determine whether it is an indoor or an outdoor type of light. FIG. 3 combines the RGB components and compares the overall wave length. According to another embodiment, a classifier can be determined based on the relative intensity of each RGB components (e.g., red versus green, relative intensity of red versus blue). The classifier can be based on multiple data samples (e.g., various indoor environments, various outdoor environments). The data sample can be used to train the classifier to distinguish the indoor or outdoor environment based on color spectrum map.

Other features extracted from the camera image can also be used to determine whether the device is indoors or outdoors. For example, image texture can be instructive, with certain textures being indicative of indoor environments and others being indicative of outdoor environments. Texture features can be extracted by way of computing Discrete Cosine Transform (DCT) coefficients. The presence of certain objects in the image can also be information. For example, identifying sky or grass in the image indicates the device is likely outdoors. Edge detection can also be useful with a large number of edges in the camera image being indicative of indoor environments.

System Architecture

Figure 2:
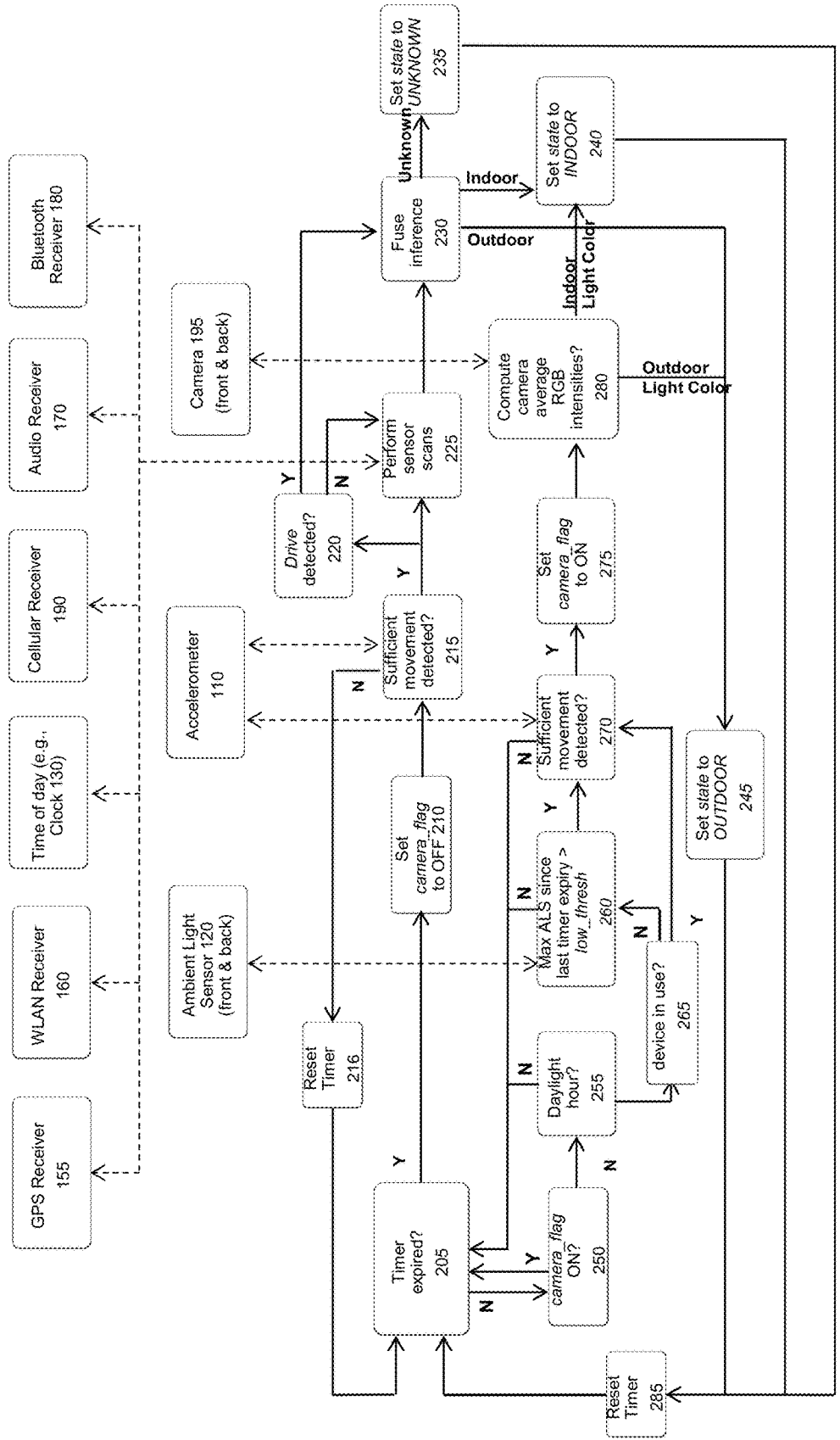
FIG. 2 illustrates a low power always-on architecture for an indoor/outdoor determination, according to some embodiments.

FIG. 2 illustrates a low power always-on architecture 200 for an indoor/outdoor determination, according to some embodiments. FIG. 2 can use the high and low power sensors from FIG. 1 to make the indoor/outdoor determination for the system 100.

At a high level, the architecture 200 comprises several features that contribute to efficient low-power always-on determination of indoor/outdoor state.

First, the architecture 200 can be implemented to maintain a current state relating to indoor v. outdoor status and periodically issue a call to wake-up and update the state. For example, possible states can include indoors 240, outdoors 245, or unknown 235. In some instances, as illustrated in the primary branch of FIG. 2, the architecture 200 can be designed to periodically wake-up high power sensors 150 to take measurements and update the state accordingly. In some other instances, as illustrated in the secondary branch of FIG. 2, the architecture can use always-on low power sensors 105 to instantaneously determine if the state has changed.

Second, the architecture 200 can gate updates to the state based on whether or not sufficient movement has been detected since the last timer wake-up by an always-on motion state classifier. For example, the system 100 can use an accelerometer 110 for an always-on motion classifier. In some instances, the motion classifier can be always-on and run in the background on a low power processor. The motion classifier can indicate to the system 100 if the device has moved a significant distance or whether the device is stationary. Therefore, the motion classifier can be used to gate any further processing. For example, when the motion classifier determines that the device has not moved sufficiently since the last system wake-up, any additional processing will be wasted as the device's indoor/outdoor state is unlikely to have changed.

Third, an ALS 120 can be used to further gate high power sensors 150. In some instances, the ALS 120 can gate turning on a camera 195 based on whether any light has been observed by the ALS 120. For example, if the ALS 120 gives a very low reading (e.g., less than low_threshold), it can be assumed that the device is concealed (e.g., in the user's pocket) and any use of the camera to determine the indoor/outdoor state will be wasted.

Fourth, the system 100 can gate turning on high power sensors 150 or checking the ALS 120 based on the time of day for the user's geographic location. For example, if it is determined that at the user's current geographic location it is currently nighttime, any additional sensor processing will be wasted.

According to some embodiments, the architecture illustrated in FIG. 2 can have primary and secondary branches. In some instances, the purpose of the primary branch is to gate high power sensors 150 with intensive processing based primarily on an absence of movement. In some instances, the purpose of the secondary branch is to attempt to make quick indoor/outdoor determinations based on light color determined from the camera 195, but gated by the ALS 120 and movement (e.g., accelerometer 110).

Primary Branch

With regards to the primary branch, low power sensors 105 can gate and prevent the intensive processing of the high power sensors 150 when the system 100 determines that the high power sensors 150 are not needed.

According to some embodiments, the system 100 can have a processor which uses low power sensors 105 and based on the information derived from the low power sensors 105, they system 100 can wake up other processors. By using an always-on low power sensor 105, it makes an always-on determination of the indoor/outdoor state feasible.

In some instances, the assumption in the primary branch is that if the system is able to make a determination based on the camera (e.g., when camera is not concealed), then the system would already have done it at a previous point in time in the secondary branch. Therefore, the primary branch tries to determine the indoor/outdoor state of the device without the use of a camera. By using a timer, the system 100 can periodically wake-up other high power sensors 150 to update the indoor/outdoor state of the device.

The architecture 200 illustrates an implementation of the system according to some embodiments. As previously mentioned the primary branch of FIG. 2 is periodic and runs on a timer. At step 205, when the timer expires, the process is initiated.

According to some embodiments, the timer can be configurable parameter with a default setting (e.g., 30 seconds). Once the timer expires in step 205, the system can set the camera_flag to OFF in step 210. By setting the camera_flag to OFF, the system can use the timer from the primary branch to reset the camera_flag, if it was turned ON in the secondary branch. As will be later discussed in step 250, the camera_flag prevents the system 100 from taking unnecessary camera images once the secondary branch has already taken a camera image.

According to some embodiments, an optional check after step 210, which is not shown in FIG. 3, is to determine if at any point since the timer last expired, an ALS value greater than a high threshold value (e.g., 500 lux) had been observed. If ALS is greater than the high threshold value, this can be a clear indication that the device has been exposed to outdoor light and hence the state is immediately changed to outdoors. If the ALS value is not greater than the high threshold value, the system 100 proceeds to determine whether sufficient movement has been detected in step 215.

In step 215, the system 100 can gate intensive processing based primarily on an absence of movement. Step 215 can be implemented in many different ways. For instance, a motion detector can be used to gate a slightly more intensive motion state classifier which determines user's motion (e.g., walking, running, sitting, standing, fiddling with device, resting, driving). If a sufficient amount of motion (e.g., pedestrian, vehicular) has been detected, then it is likely the user has changed location and it is necessary for the system to perform more intensive sensor scans in step 225 and processing using high power sensors 150 in order to reestablish the current state.

In step 215, if it is determined that sufficient movement has not been detected, the system 100 resets the timer 216 and the process restarts back to step 205. Alternatively, if the system determines that there has been sufficient movement in step 215, then the system 100 proceeds to step 225 to perform sensor scans.

In step 220, an optional step, the system 100 can include a drive detector to detect if the device is inside a vehicle that is being driven. If it is determined that the device is inside a vehicle being driven, then there is more of a probability that the indoor/outdoor state will be set to outdoors 245. For example, if the device is travelling at a speed of over 10 mph, then it can be assumed that the user is not walking and inside a vehicle. However, the driving detector may not be accurate, therefore in step 230 the system makes an indoor/outdoor determination based on all the sensor data. For example, if the vehicle is stopped at a stop light, the system cannot determine that the vehicle is being driven. Alternatively, there are instances when it may be determined that the vehicle is being driven, when in fact it is not the case (e.g., train example). Therefore, to make an accurate determination, the system can be setup to make an inference on the indoor/outdoor state of the device based on the drive detector and other sensor outputs.

In one instance, if a sufficient amount of driving has been detected in step 220 since the last timer expiration, the system 100 may decide to automatically set the indoor/outdoor state to outdoors 245 and skip step 230.

In step 225, the system can perform sensor scans and leverage all of the outputs from the sensors to determine a state. As previously mentioned, since the device is assumed to be concealed, the primary branch performs high power sensor scans without taking light readings. For example, the system does not need to use the camera or ALS for retrieving light information.

For example, the high power sensors that can be used in step 225 include, but are not limited to, GPS receiver 155, WLAN receiver 160, time of day (e.g., clock 130), cellular receiver 190, audio receiver 170 and Bluetooth receiver 180. The sensor scan block (illustrated on the top of FIG. 2) consists of using high power sensors 150 and the time of day for indoor/outdoor state determination as outlined in the high power sensors 150 section of this disclosure.

In step 230, the system collects the information obtained from the various sensors in step 225 to make an indoor/outdoor state determination. For instances, a plethora of classifiers (e.g., naïve Bayes, decision trees, SVMs) can be used to fuse the information from the various sensors. In some instances, when there is insufficient information, or the information is ambiguous, the state is set to unknown 235. Therefore, once the determination is complete in step 230, the inference can result in either an indoor 240, outdoors 245 or unknown 235 state classification.

According to some embodiments, different algorithms can be used with the combination of different high power sensors to determine the indoor/outdoor state, based on power consumption and accuracy preferences.

Additionally, step 230 incorporates the readings from the drive detector. For example, if the drive detector determines that the vehicle is being driven, then the inference in step 230 can lend more weight to the OUTDOORS state. Therefore, when the indoor/outdoor determination is made, there is a higher probability that the state is set to OUTDOORS if it assumed that the vehicle is being driven.

According to some embodiments, using the optional step previously mentioned, the ALS can be utilized to automatically determine an outdoor 245 state. The system 100 can use the ALS to instantly determine that the device is outdoors 245, if the ALS 120 returns a high value (e.g., greater than 500 lux). For example, if the light intensity from the ALS 120 has a lux value greater than 500, then the system can assume that the device is outdoors 245. During daylight the lux value for outdoor environments can range from as low as 500 up to 20,000. It can be assumed that the light intensity in an indoor environment is not going to be brighter than 500 lux. Therefore, the system can use the ALS reading when it is greater than a certain high value threshold (e.g., 500 lux), as a clear delineation between outdoor and indoor environments. Thus if the device is outdoors and not concealed, a high lux value can be an easy determination that the device is outdoors and the state can be set to outdoors.

Secondary Branch

In the secondary branch in FIG. 2, the system 100 can determine the indoor/outdoor state when the device is not concealed (e.g., out of the user's pocket). This determination can be based on an always-on ALS 120 detecting a change in the ambient light level to trigger the camera to capture an image. In comparison to the camera 195, the ALS uses less power to run. For example, if the ALS 120 level is above a low threshold, then the system 100 determines that at least some light is detect by the device. Therefore, the system can initiate the camera 195 to capture an image and use the image to determine the color of the light.

According to some embodiments, the secondary branch can be explored opportunistically. For example, using the secondary branch, the system 100 can attempt to make quick indoor/outdoor state determination based on light color determined from a camera 195, but gated by an ALS 120 and movement.

For instances, if a user momentarily takes the device out of his/her pocket, a non-zero ALS value can trigger the camera 195 to capture an image. A camera-based light color determination can, in most cases, conclusively determine whether the device is indoors 240 or outdoors 245. Therefore, by using the camera image, the system 100 can determine the indoor/outdoor state.

Additionally, there may not be an unknown 235 state in the secondary state when using a camera image. For example, from the camera image, the system can look at the light intensity. From the light intensity, the system 100 can determine if it is indoor or outdoor lighting to determine the indoor/outdoor state. Therefore, using the camera image, the system 100 can determine and update its indoor/outdoor state, before going back to sleep. Additionally, the ALS 120 can prevent the device from taking power intensive measurements with a camera when the device is inside your pocket.

In contrast to the primary branch, the secondary branch can initiate the high power sensors (e.g., camera 195) even when the timer has not expired. For example, in the secondary branch, the system 100 can initiate the camera 195 to capture an image based on the ALS 120 readings. Whereas in the primary branch, the determination is periodic and based on a timer.

Additionally, according to some embodiments, the secondary branch can be tied to a second clock which expires faster than the timer period from the primary branch. Alternatively, according to another embodiment, the secondary branch can be tied to a second clock that can be as fast as the processor clock.

The secondary branch commences at step 250, where the system 100 checks to determine if a camera image has been taken since the last timer period. For example, the camera_flag can prevent the system 100 from doing the secondary branch, if a camera image has been taken since the last timer period. By making the system 100 wait until the timer period from the primary branch expires again, it prevents the system 100 from taking multiple and unnecessary camera images. In comparison to the timer clock (e.g., 30 seconds) in the primary branch, the secondary branch can occur as fast as the processor clock. Furthermore, the system 100 needs a mechanism to prevent multiple images being captured by the camera 195 within one timer clock. Therefore, if the camera_flag is ON, the system 100 goes back to step 205. However, if the camera_flag is set to OFF, the system 100 proceeds to step 255.

In step 255, the system checks that daylight is present at the current time for the current geographic location using a clock 130. As previously mentioned, using the time of day, the system 100 can inferred that a user is more likely to be indoors at certain times of the day (e.g., sleeping late at night). Additionally, the system 100 can gate the use of the camera 195 during non-daylight hours. For example, if the user is at a particular location and there is no daylight, then capturing an image of the light is not going to help determine the indoor/outdoor state. According to some embodiments, the system 100 can determine the daylight hours and non-daylight hours for a particular location and use this information as a gating mechanism for the high power sensors. Therefore, if it is a daylight hour, the system 100 proceeds to step 260. However, if it is not a daylight hour, then the system 100 goes back to step 205.

In some instances, the daylight gating mechanism can be a small processor residing near the ALS 120. Therefore, when the ALS value goes above a threshold, the small processor also checks if the daylight hour condition is satisfied. Then the small processor can check to see if the camera flag condition is satisfied. In this embodiment, the small processor is a subsystem tied with the ALS 120. As shown in this example, the order of these triggering events can be performed in different order.

In step 260, the system checks if the device is not concealed using the ALS. For example, the system checks whether the current ALS reading is above a low threshold value (e.g., low_threshold=5 lux), which can be indicative of the device is not concealed (e.g., out of the user's pocket).

In some instances, when the user is using the device in step 265, the system does not need to check the ambient light sensor because the device is assumed to not be concealed. In this instance, the system skips the ALS test in step 260 and proceeds to step 270. Alternatively, if it is determined that the device is not in use in step 265, then the system does the ALS test in step 260.

Alternatively, a user can take the device out of his pocket without turning on the screen of the device. Therefore, in step 260, the system 100 check if the maximum ALS value since last timer expiration is greater than a low threshold value. The low threshold value can be set to allow the system to determine if the device has been exposed to any light during the timer period. For example the low threshold value can be at 5 lux, since anything below 5 lux can be interpreted as the device being concealed. Therefore step 260 can be a gating mechanism to prevent the camera from being used when the device is concealed. If the system determines the device is concealed in step 260, then the process goes back to the beginning step 205. However, if the system determines that the device is not concealed in step 260, the system continues to step 270.

After step 260, the system 100 checks if sufficient movement has been detected in step 270. In some instances, the device might be lying on a desk. In this example, the ALS value is greater than low threshold, but the device has not moved, therefore the indoor/outdoor state has not changed. In such an instance, the system 100 verifies that there has been sufficient movement since the timer last expired, to warrant doing more intensive computation. For example, it the system 100 determines that the device has not moved, it can assume that the indoor/outdoor state has not changed.

Step 270 is another gating mechanism to prevent the system from taking a camera image, if the system 100 has not detected any significant movement. For example, without this gating mechanisms, every time that the timer expires, the camera captures a picture even if device has not moved (e.g., the device is left on a desk). The gating mechanisms in step 270 prevents the camera from initiating if the device has not moved any significant distance in order to preserve the system's resources. According to some embodiments, when there is no significant movement, the process goes back to the step 205. Alternatively, if there is significant movement, then the system captures an image and proceeds to step 275 and step 280.

In step 275, after it is determined that there is significant movement, the camera_flag is set to ON. The camera_flag is set to ON to prevent the system from taking multiple camera images during a single timer period, since the clock in the secondary branch is faster than the timer clock. Therefore, the camera_flag is set to ON in step 270 so that the system 100 does not repeatedly enter the secondary branch.

If sufficient movement has been detected in step 270, the system 100 can captures a camera image in step 280. For example, the system 100 can request the camera 130 to receive the image colors. From the image colors, the system 100 can compute the average RGB intensities. As illustrated in FIG. 3, the average RGB intensities can be used to determine an indoor or outdoor state.

For example, this three dimensional vector (average RGB intensities) is then used to determine if the light on the device is natural or artificially. This determination can fairly accurately set the indoor/outdoor state to either INDOOR 240 or OUTDOOR 245.

Once the system determine the color of the light and make an indoor/outdoor determination in step 280, the system 100 can reset the timer in step 285.

In summary, in the secondary branch, an event trigger can occur whenever the ambient light is above a low threshold value (e.g., step 260), the camera_flag is set to OFF (e.g., step 250), and/or the system determines it is daylight hours (e.g., step 255). The event trigger then wakes up another processor. For instances, this other processor can be used to determine if sufficient movement has been detected (e.g., step 270). If sufficient movement is detected, then the system uses the camera (e.g., step 275, step 280) to determine the indoor/outdoor state of the device. These event triggers can be independent of each other. Additionally, the combination and/or order of these event triggers can differ according to different embodiments.

For example, in the secondary branch, the system is continuously trying to determine the indoor/outdoor state by using the camera along with the motion gating and the ambient light gating. However, if the device is concealed for more than a timer period (e.g., 30 seconds), at that point the timer for the primary branch expires and it initiates the start of the primary branch. Since the system was not able to make any determination based on the camera, the system tries to use the primary branch to make an indoor/outdoor state determination.

The methods and system architectures discussed above are examples. Various embodiments may omit, substitute, or add various gating mechanisms or sensors as appropriate. For instance, in alternative configurations, the methods described may be performed in an order different from that described, and/or various stages may be added, omitted, and/or combined.

Example of Indoor/Outdoor State Determination

Figure 4:
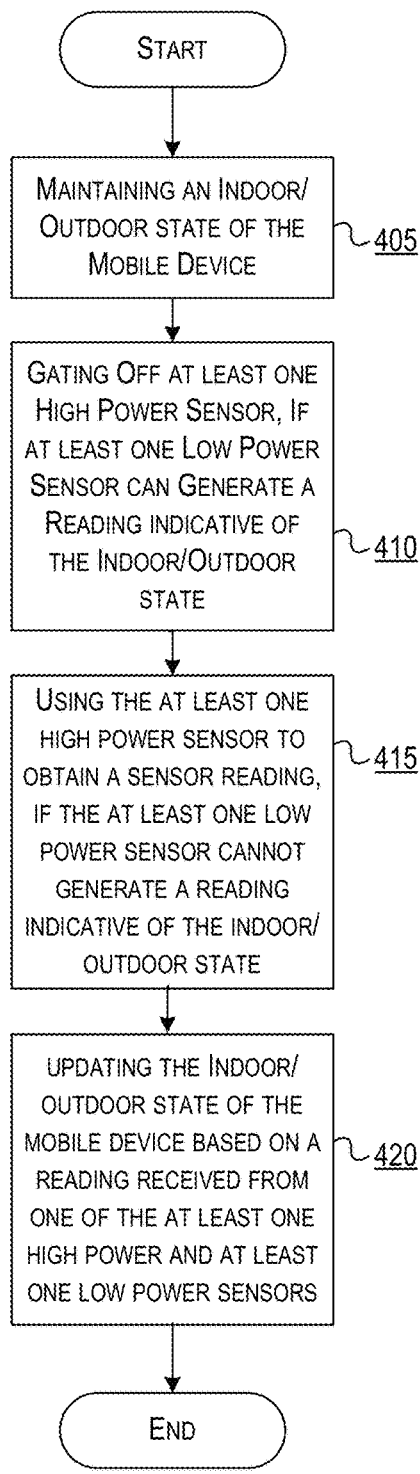
FIG. 4 illustrates an example method for determining indoor/outdoor state of a mobile device according to some embodiments.

FIG. 4 illustrates an example method for determining indoor/outdoor state of a mobile device according to some embodiments. The processing illustrated in FIG. 4 may be implemented in software (e.g., computer-readable instructions, code, programs, etc.) that can be executed by one or more processors and/or other hardware components. Additionally or alternatively, the software may be stored on a non-transitory computer readable storage medium.

As seen in FIG. 4, the method may be initiated in step 405, in which the system 100 maintains an indoor/outdoor state of the mobile device. In some embodiments, the indoor/outdoor state is selected from a plurality of possible states including an indoor state and an outdoor state.

In step 410, the system 100 can gate off high power sensors 150 if a low power sensors 105 can determine the indoor/outdoor state. For example, step 220 and the optional step where the ALS value is greater than high_threshold can automatically set the indoor/outdoor state to outdoors 245. Alternatively, in step 255, if the system determines that it is the middle of the night, then the system 100 can set the indoor/outdoor state to indoor 240.

In step 415, the system 100 can use high power sensors 150 to determine the indoor/outdoor state if the low power sensors 105 cannot determine the indoor/outdoor state. For example, in step 225 and step 230, the system 100 performs high power sensor scans to determine the indoor/outdoor state. Additionally, in step 280, the system 100 initiates a camera to capture an image to determine the indoor/outdoor state.

In step 420, based on the readings from the low power sensors 105 and/or high power sensors 150, the system 100 can update the indoor/outdoor state of the device.

Example of Gating High Power Sensors for an Always-On Mode

Figure 5:
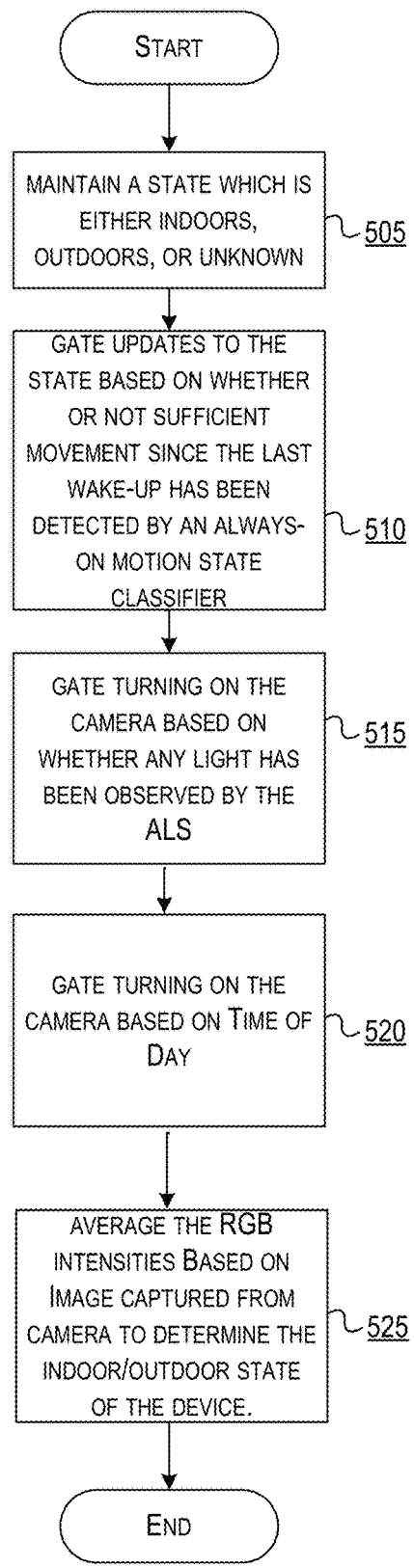
FIG. 5 illustrates an always-on method for a low-power indoor/outdoor determination by gating the high power sensors, according to some embodiments.

FIG. 5 illustrates an always-on method for a low-power indoor/outdoor determination by gating the high power sensors, according to some embodiments.

In step 505, the system can maintain a state which is either indoors, outdoors, or unknown. Additionally, according to some embodiments, the system can periodically issue a call to wake-up and update the state.

In step 510, the system can gate updates to the state based on whether or not sufficient movement since the last wake-up has been detected by an always-on motion state classifier (e.g., step 215 and step 270 of FIG. 2). For example, if little or no movement (e.g. not walking, running, driving) has been detected since the last wake up, any additional processing is unnecessary as the users indoor/outdoor state is unlikely to have changed.

In step 515, the system can gate turning on the camera based on whether any light has been observed by the ALS. For example, in step 260 of FIG. 2, if the ALS gives a very low reading (e.g., less than 5 lux), then the system can determine that the device is concealed (e.g., in the user's pocket, purse, bag). Therefore, any use of the camera to determine indoor/outdoor is unnecessary when the device is concealed.

In step 520, the system can gate turning on the camera based on the time of day. For example, in step 255 of FIG. 2, if it is determined that at the user's current geographic location it is currently nighttime, any additional camera or ALS processing may be unnecessary.

In step 525, the system 100 can use a camera 195 to capture an image. By averaging the RGB intensities from the camera image, the system can determine the indoor/outdoor state of the device. According to this embodiment, step 525 only occurs if the camera is not gate from the triggering events in step 510, step 515 and step 520. Therefore by gating the camera, the system 100 conserves battery power which makes an always-on mode feasible.

Correct Indoor/Outdoor Determination

Having described several methods in FIG. 4 and FIG. 5 in which a system 100 can operate in a low power always-on mode to determine the indoor/outdoor state of the device, several examples illustrating the need for accurate indoor/outdoor state determination will now be discussed.

To illustrate, in the patio/living room example, conventional methods might incorrectly determine that the user is indoors when the user is actually on the patio. For example, conventional methods might base the indoor/outdoor determination using a WLAN receiver to monitor signals and to determine the indoor/outdoor state of the device. In conventional methods, the number of visible APs and their RSSI can gives an indication that the device is indoors. For example, the system can see many APs or APs with strong RSSI, and determine that the user is indoors. Furthermore, as the user walks between the living room to the patio, or vice-versa, conventional methods based on GPS latitude/longitude information may not identify that the indoor/outdoor state has changed.

Unlike the conventional methods, according to some embodiments disclosed in the disclosure, the system 100 can correctly determine the indoor/outdoor state of the device in the patio/living room example. For example, when a user walks from the living room to the patio, or vice-versa, the accelerometer 110 can detected that sufficient movement has occurred in step 215 or step 270 of FIG. 2. Then, the system can use high power sensors 150 to determine if the indoor/outdoor state has changed. In some instances, the camera 195 can capture an image in to correctly determine the indoor/outdoor state by averaging the RGB intensities in step 280. In another instance, the system 100 can perform sensor scans in step 225 and use the sensor data to correctly determine the indoor/outdoor state in step 230.

In the elevator example, conventional methods might incorrectly determine that the user is indoors when in fact the user in on the rooftop of a building. For example, conventional methods might base the indoor/outdoor determination using a GPS receiver. By solely using the GPS position information, conventional methods can incorrectly determine that the user in indoors, because the GPS position information and mapping information show that the user in located inside a building.

Unlike the conventional methods, the system 100 can correctly determine the indoor/outdoor state of the device in the elevator example. For example, when a user uses an elevator to get to and from the rooftop, the accelerometer 110 can detected that sufficient movement has occurred in step 215 or step 270. Then, the system can use high power sensors 150 to determine if the indoor/outdoor state has changed. In some instances, the camera 195 can capture an image in to correctly determine the indoor/outdoor state using step 280. In other instances, the system 100 can perform sensor scans in step 225 and use the sensor data to correctly determine the indoor/outdoor state in step 230. For example, measuring strong cellular signal strength using the cellular receiver 190 and weak AP signal strength using the WLAN receiver 160, the system can determine that the user is on the roof and outdoors 245.

In the train example, conventional methods might incorrectly determine that indoor/outdoor state of the user based on the velocity readings from the GPS receiver and/or cellular receiver. For example, conventional methods might assume that the user's location is changing based on the change in velocity and/or location. Therefore the conventional system may specifically not gate further updates, as the location of the device is constantly changing. As a result, even though the device is indoors (e.g., inside a train), the conventional system may constantly use high power sensors to make an indoor/outdoor state determination which can drain the battery of the device.

This particular train example illustrates that the indoor/outdoor state is not considered a type of location state for which updates are gated when motion is detected, by presenting a scenario where the system 100 behaved in a different manner. Unlike the conventional methods, the system 100 can accurately determine the indoor/outdoor state of the device in the train example. For example, when a user is traveling in a train, the system can determine that the user is riding on a train based on motion classification and gate further updates as the indoor/outdoor state is unchanging. For example, the motion classification (e.g., accelerometer 110) can detected that sufficient movement has occurred in step 215 or step 270. Then, the system can determine that the device is inside a train based on the reading from the motion classification. As a result, the system can gate the high power sensors 150 to conserve battery power since the indoor/outdoor state does not need to be updated. In other instances, the system 100 can perform sensor scans in step 225 and use the sensor data along with the motion classification to determine that the system 100 is inside a train. For example, they system 100 can infer that the user in indoors, even though the user is traveling at a high velocity because the WLAN receiver can determine that the APs are staying constant throughout the train journey.

The methods, systems, and devices discussed in this disclosure are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Figure 6:
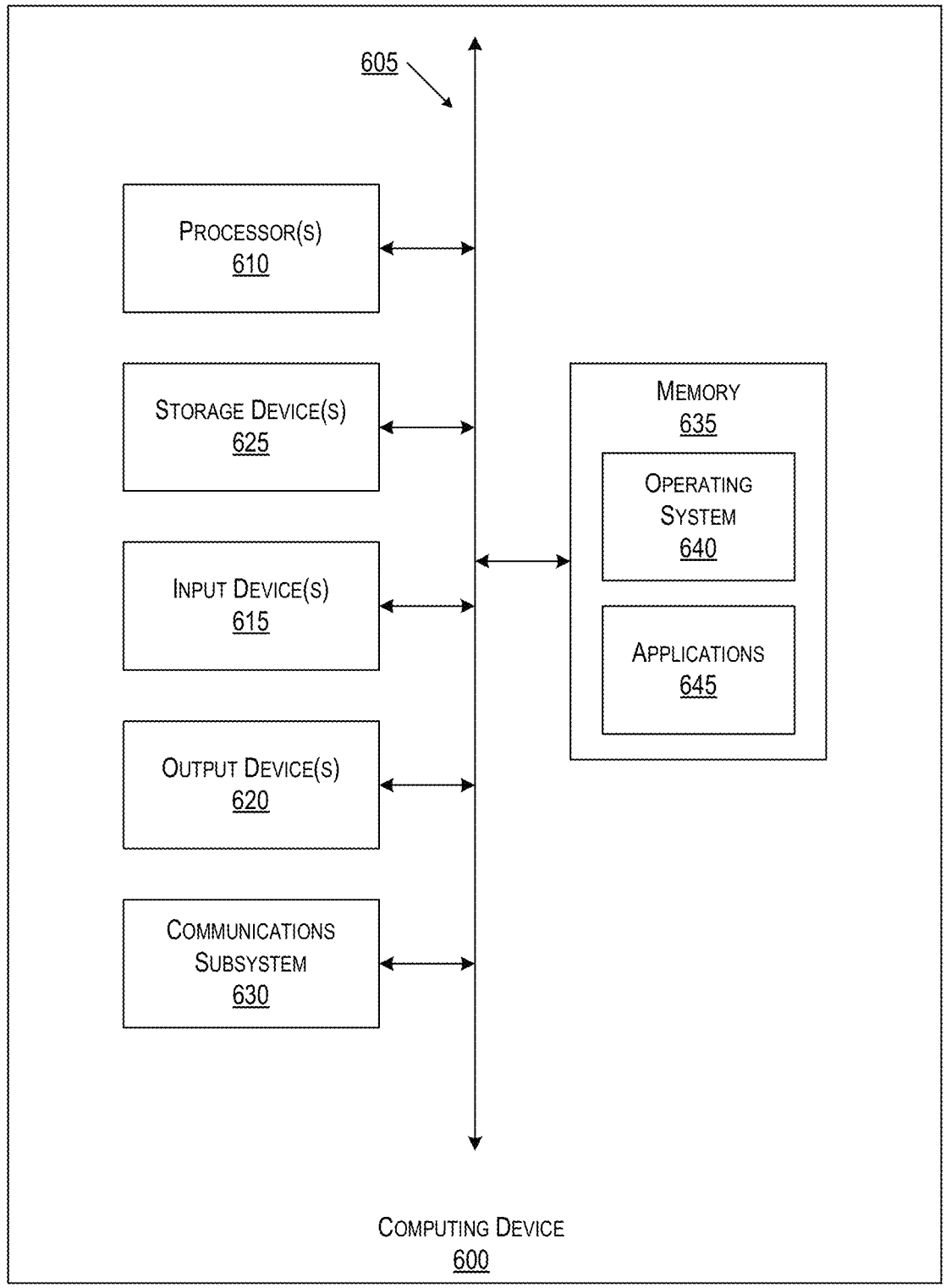
FIG. 6 illustrates an example of a computing system in which one or more embodiments may be implemented.

According to one or more aspects, a computer system as illustrated in FIG. 6 may be incorporated as part of a computing device, which may implement, perform, and/or execute any and/or all of the features, methods, and/or method steps described herein. For example, computer system 600 may represent some of the components of a system 100, or any other computing device, such as a laptop computer, a tablet computer, a mobile device. FIG. 6 provides a schematic illustration of one embodiment of a computer system 600 that can perform the methods provided by various other embodiments, as described herein. FIG. 6 is meant only to provide a generalized illustration of various components, any and/or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a camera, a mouse, a keyboard and/or the like; and one or more output devices 620, which can include without limitation a display unit, a printer and/or the like. The low power sensors 105 and the high power sensors 150 in system 100 are examples of input devices 615. Additionally the processing for steps (e.g., step 215, step 230, step 260, step 270, step 280) in FIG. 2 can be performed by one or more processors 610.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. For example the camera_flag, low_threshold, high_threshold values can be stored in the storage device 625.

The computer system 600 might also include a communications subsystem 630, which can include without limitation a modem, a network card (wireless or wired), an infrared communication device, a wireless communication device and/or chipset (such as a Bluetooth® device, an 802.11 device, a Wi-Fi device, a WiMax device, cellular communication facilities, etc.), and/or the like. For example, the cellular receiver 190, WLAN receiver 160 and Bluetooth receiver 180 can be part of the communications subsystem.

The communications subsystem 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 4 and FIG. 5, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein, for example one or more steps of the methods described with respect to FIG. 4 and FIG. 5.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, in some embodiments, a device other than a small cell 340 may include and/or otherwise provide one or more of the components and/or functionalities discussed above, and accordingly may implement one or more embodiments described herein.

In still additional and/or alternative embodiments, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for determining a state of a mobile device comprising:
   maintaining an indoor/outdoor state of the mobile device, wherein the indoor/outdoor state is selected from a plurality of possible states including an indoor state and an outdoor state;
   wherein the mobile device includes at least one first sensor and at least one second sensor, wherein the at least one first sensor includes a camera;
   obtaining a first sensor reading from the second sensor;
   determining if the first sensor reading is sufficient to determine an indoor/outdoor state of the device; and
   responsive to determining that the first sensor reading is not sufficient to determine an indoor/outdoor state of the device:
      determining a local time associated with the mobile device;
      responsive to determining that the local time corresponds to a daylight time, determining if the mobile device is not concealed;
      responsive to determining that the mobile device is not concealed, capturing a camera image from the camera, wherein the camera image includes a red, green and blue (RGB) value for pixels in the camera image; and
      updating the indoor/outdoor state of the mobile device based, at least in part, on a RGB value of one or more pixels of the pixels in the camera image.

2. The method of claim 1, further comprising:
   using a timer to periodically obtain subsequent first sensor readings from the at least one second sensor, wherein the at least one second sensor comprises a motion detector;
   determining whether movement has occurred based on periodic subsequent first sensor readings from the motion detector; and
   responsive to a determination that a movement has occurred, using a second sensor reading from the at least one first sensor to update the indoor/outdoor state of the mobile device.

3. The method of claim 1, wherein the at least one second sensor comprises an accelerometer, the method further comprising:
   responsive to determining the mobile device is inside a moving vehicle based on the first sensor reading from the accelerometer, updating the indoor/outdoor state based on determination of the mobile device being inside the moving vehicle.

4. The method of claim 1, wherein the at least one second sensor comprises an ambient light sensor (ALS), the method further comprising:
   responsive to determining that the local time corresponds to the daylight time, determining that the first sensor reading is sufficient to determine an indoor/outdoor state of the device.

5. The method of claim 1, wherein the at least one second sensor comprises an ambient light sensor (ALS), the method further comprising:
   responsive to determining the first sensor reading from the ALS is greater than a first predetermined value, determining that the first sensor reading is sufficient to determine an indoor/outdoor state of the device.

6. The method of claim 1, wherein the at least one second sensor comprises an ambient light sensor (ALS), the method further comprising:
   responsive to determining the first sensor reading from the ALS is greater than a second predetermined value, determining that the first sensor reading is not sufficient to determine an indoor/outdoor state of the device.

7. The method of claim 1, the method further comprising:
   responsive to determining that the first sensor reading or the camera image is sufficient to determine an indoor/outdoor state of the device, gating off the at least one first sensor and updating the indoor/outdoor state of the device based on the first sensor reading or the camera image.

8. The method of claim 1, wherein the at least one second sensor comprises an always-on motion classifier and the method further comprising:
   determining a change in movement by the always-on motion classifier;
   classifying the change in movement as indicative of a change in the indoor/outdoor state; and
   using the camera to capture the camera image based on the determination of the motion classifier.

9. The method of claim 8, wherein the change in movement when resulting from the mobile device being inside a train or a vehicle in motion is not classified as being indicative of a change in the indoor/outdoor state.

10. The method of claim 1, wherein the at least one second sensor comprises a motion detector, the method further comprising:
    responsive to determining that the first sensor reading indicates movement of the device and a determination that the mobile device is in use, using the camera to generate the reading indicative of the indoor/outdoor state of the mobile device.

11. The method of claim 1, wherein the plurality of possible states includes an unknown state.

12. The method of claim 1, wherein the at least one first sensor includes at least one of:
a GPS receiver;
a WLAN receiver;
an audio receiver;
a Bluetooth receiver; and
a cellular receiver.

13. The method of claim 1, wherein the at least one second sensor includes at least one of:
an accelerometer;
a motion detector;
a clock;
an ambient light sensor;
a weather sensor; and
a temperature sensor.

14. The method of claim 1, further comprising, wherein the at least one first sensor is associated with higher power consumption than the at least one second sensor.

15. A mobile device comprising:
one or more processors for determining indoor/outdoor state of the mobile device; and
memory storing computer-readable instructions that, when executed by the one or more processors, cause the mobile device to:
  maintain an indoor/outdoor state of the mobile device, wherein the indoor/outdoor state is selected from a plurality of possible states including an indoor state and an outdoor state;
  wherein the mobile device includes at least one first sensor and at least one second sensor, wherein the at least one first sensor includes a camera;
  obtain a first sensor reading from the second sensor; and
  determine if the first sensor reading is sufficient to determine an indoor/outdoor state of the device;
  responsive to determining that the first sensor reading is not sufficient to determine an indoor/outdoor state of the device:
    determine a local time associated with the mobile device;
    response to determining that the local time corresponds to a daylight time, determining if the mobile device is not concealed;
    responsive to determining that the mobile device is not concealed, capturing a camera image from the camera, wherein the camera image includes a red, green and blue (RGB) value for pixels in the camera image; and
    update the indoor/outdoor state of the mobile device based, at least in part, on a RGB value of one or more pixels of the pixels in the camera image.

16. The mobile device of claim 15, wherein the memory further comprises instructions that cause the mobile device to:
use a timer to periodically obtain subsequent first sensor readings from the at least one second sensor, wherein the at least one second sensor comprises a motion detector;
determine whether movement has occurred based on periodic subsequent first sensor readings from the motion detector; and
responsive to a determination that a movement has occurred, use a second sensor reading from the at least one first sensor to update the indoor/outdoor state of the mobile device.

17. The mobile device of claim 15, wherein the at least one second sensor comprises an accelerometer, and wherein the memory further comprises instructions that cause the mobile device to:
responsive to a determination the mobile device is inside a moving vehicle based on the first sensor reading from the accelerometer, update the indoor/outdoor state based on determination of the mobile device being inside the moving vehicle.

18. The mobile device of claim 15, wherein the at least one second sensor comprises an ambient light sensor (ALS), and wherein the memory further comprises instructions that cause the mobile device to:
responsive to a determination that the local time corresponds to the daylight time, determine that the first sensor reading is sufficient to determine an indoor/outdoor state of the device.

19. The mobile device of claim 15, wherein the at least one second sensor comprises an ambient light sensor (ALS), and wherein the memory further comprises instructions that cause the mobile device to:
responsive to a determination the first sensor reading from the ALS is greater than a first predetermined value, determine that the first sensor reading is sufficient to determine an indoor/outdoor state of the device.

20. The mobile device of claim 15, wherein the at least one second sensor comprises an ambient light sensor (ALS) and wherein the memory further comprises instructions that cause the mobile device to:
responsive to a determination the first sensor reading from the ALS is greater than a second predetermined value, determine that the first sensor reading is not sufficient to determine an indoor/outdoor state of the device.

21. The mobile device of claim 15, wherein the memory further comprises instructions that cause the mobile device to:
responsive to determining that the first sensor reading or the camera image is sufficient to determine an indoor/outdoor state of the device, gate off the at least one first sensor and update the indoor/outdoor state of the device based on the first sensor reading or the camera image.

22. The mobile device of claim 15, wherein the at least one second sensor comprises an always-on motion classifier and wherein the memory further comprising instructions that cause the mobile device to:
determine change in movement by the always-on motion classifier;
classify the change in movement as indicative of a change in the indoor/outdoor state; and
use the camera to capture the camera image based on the determination of the motion classifier.

23. The mobile device of claim 22, wherein the change in movement when resulting from the mobile device being inside a train or a vehicle in motion is not classified as being indicative of a change in the indoor/outdoor state.

24. The mobile device of claim 15, wherein the at least one second sensor comprises a motion detector and wherein the memory further comprising instructions that cause the mobile device to:
responsive to a determination that the first sensor reading indicates movement of the device and a determination that the mobile device is in use, use the camera to generate the reading indicative of the indoor/outdoor state of the mobile device.

25. The mobile device of claim 15, wherein the plurality of possible states includes an unknown state.

26. The mobile device of claim 15, wherein the at least one first sensor includes at least one of:
a GPS receiver;
a WLAN receiver;
an audio receiver;
a Bluetooth receiver; and
a cellular receiver.

27. The mobile device of claim 15, wherein the at least one second sensor includes at least one of:
an accelerometer;
a motion detector;
a clock;
an ambient light sensor;
a weather sensor; and
a temperature sensor.

28. One or more non-transitory computer-readable media storing computer-executable instructions that, when executed, cause one or more computing device included in a mobile device to:
maintain an indoor/outdoor state of the mobile device, wherein the indoor/outdoor state is selected from a plurality of possible states including an indoor state and an outdoor state;
wherein the mobile device includes at least one first sensor and a at least one second sensor, wherein the at least one first sensor includes a camera;
obtain a first sensor reading from the second sensor;
determine if the first sensor reading is sufficient to determine an indoor/outdoor state of the device; and
responsive to determining that the first sensor reading is not sufficient to determine an indoor/outdoor state of the device:
determine a local time associated with the mobile device;
responsive to determining that the local time corresponds to a daylight time, determining if the mobile device is not concealed;
responsive to determining that the mobile device is not concealed, capturing a camera image from the camera, wherein the camera image includes a red, green and blue (RGB) value for pixels in the camera image; and
update the indoor/outdoor state of the mobile device based, at least in part, on a RGB value of one or more pixels of the pixels in the camera image.

29. The one or more non-transitory computer-readable media of claim 28, further comprising instructions that cause the one or more computing device to:
use a timer to periodically obtain subsequent first sensor readings from the at least one second sensor, wherein the at least one second sensor comprises a motion detector;
determine whether movement has occurred based on periodic subsequent first sensor readings from the motion detector; and
responsive to a determination that a movement has occurred, use a second sensor reading from the at least one first sensor to update the indoor/outdoor state of the mobile device.

30. The one or more non-transitory computer-readable media of claim 28, wherein the at least one second sensor comprises an accelerometer, and further comprising instructions that cause the one or more computing device to:
responsive to a determination the mobile device is inside a moving vehicle based on the first sensor reading from the accelerometer, update the indoor/outdoor state based on determination of the mobile device being inside the moving vehicle.

31. The one or more non-transitory computer-readable media of claim 28, wherein the at least one second sensor comprises an ambient light sensor (ALS), and further comprising instructions that cause the one or more computing device to:
responsive to a determination that the local time corresponds to a daylight time, determine that the first sensor reading is sufficient to determine an indoor/outdoor state of the device.

32. The one or more non-transitory computer-readable media of claim 28, wherein the at least one second sensor comprises an ambient light sensor (ALS), and further comprising instructions that cause the one or more computing device to:
responsive to a determination the first sensor reading from the ALS is greater than a first predetermined value, determine that the first sensor reading is sufficient to determine an indoor/outdoor state of the device.

33. The one or more non-transitory computer-readable media of claim 28, wherein the at least one second sensor comprises an ambient light sensor (ALS), and further comprising instructions that cause the one or more computing device to:
responsive to a determination the first sensor reading from the ALS is greater than a second predetermined value, determine that the first sensor reading is not sufficient to determine an indoor/outdoor state of the device.

34. The one or more non-transitory computer-readable media of claim 33, further comprising instructions that cause the one or more computing device to:
responsive to determining that the first sensor reading or the camera image is sufficient to determine an indoor/outdoor state of the device, gate off the at least one first sensor and updating the indoor/outdoor state of the device based on the first sensor reading or the camera image.

35. The one or more non-transitory computer-readable media of claim 28, wherein the at least one second sensor comprises an always-on motion classifier and further comprising instructions that cause the one or more computing device to:
determine change in movement by the always-on motion classifier;
classify the change in movement as indicative of a change in the indoor/outdoor state; and
use the camera to capture the camera image based on the determination of the motion classifier.

36. The one or more non-transitory computer-readable media of claim 35, wherein the change in movement when resulting from the mobile device being inside a train or a vehicle in motion is not classified as being indicative of a change in the indoor/outdoor state.

37. The one or more non-transitory computer-readable media of claim 28, wherein the at least one second sensor comprises a motion detector and further comprising instructions that cause the one or more computing device to:
responsive to a determination that the first sensor reading indicates movement of the device and a determination that the mobile device is in use, use the camera to generate the reading indicative of the indoor/outdoor state of the mobile device.

38. The one or more non-transitory computer-readable media of claim 28, wherein the plurality of possible states includes an unknown state.

39. The one or more non-transitory computer-readable media of claim 28, wherein the at least one first sensor includes at least one of:
   a GPS receiver;
   a WLAN receiver;
   an audio receiver;
   a Bluetooth receiver; and
   a cellular receiver.

40. The one or more non-transitory computer-readable media of claim 28, wherein the at least one second sensor includes at least one of:
   an accelerometer;
   a motion detector;
   a clock;
   an ambient light sensor;
   a weather sensor; and
   a temperature sensor.

41. An apparatus for determining indoor/outdoor state of a mobile device comprising:
   means for maintaining an indoor/outdoor state of the mobile device, wherein the indoor/outdoor state is selected from a plurality of possible states including an indoor state and an outdoor state;
   wherein the mobile device includes at least one first sensor and at least one second sensor, wherein the at least one first sensor includes a camera;
   means for obtaining a first sensor reading from the second sensor; and
   means determining if the first sensor reading is sufficient to determine an indoor/outdoor state of the device;
   responsive to determining that the first sensor reading is not sufficient to determine an indoor/outdoor state of the device:
      means for determining a local time associated with the mobile device;
      responsive to determining that the local time corresponds to a daylight time, means for determining if the mobile device is not concealed;
      responsive to determining that the mobile device is not concealed, means for capturing a camera image from the camera, wherein the camera image includes a red, green and blue (RGB) value for pixels in the camera image; and
      means for updating the indoor/outdoor state of the mobile device based, at least in part, on a RGB value of one or more pixels of the pixels in the camera image.

42. The apparatus of claim 41, further comprising:
   means for using a timer to periodically obtain subsequent first sensor readings from the at least one second sensor, wherein the at least one second sensor comprises a motion detector;
   means determining whether movement has occurred based on periodic subsequent first sensor readings from the motion detector; and
   means for responsive to a determination that a movement has occurred, using a second sensor reading from the at least one first sensor to update the indoor/outdoor state of the mobile device.

43. The apparatus of claim 41, wherein the at least one second sensor comprises an accelerometer, the apparatus further comprising:
   means for determining whether the mobile device is inside a moving vehicle based on the accelerometer; and
   means for, responsive to determining the mobile device is inside a moving vehicle based on the first sensor reading from the accelerometer, updating the indoor/outdoor state based on the determination of the mobile device being inside the moving vehicle.

44. The apparatus of claim 41, wherein the at least one second sensor comprises an ambient light sensor (ALS), the apparatus further comprising:
   means for, responsive to determining that the local time corresponds to a daylight time, determining that the first sensor reading is sufficient to determine an indoor/outdoor state of the device.

45. The apparatus of claim 41, wherein the at least one second sensor comprises an ambient light sensor (ALS), the apparatus further comprising:
   means for, responsive to determining the first sensor reading from the ALS is greater than a first predetermined value, determining that the first sensor reading is sufficient to determine an indoor/outdoor state of the device.

46. The apparatus of claim 41, wherein the at least one second sensor comprises an ambient light sensor (ALS) the apparatus further comprising:
   means for responsive to determining the first sensor reading from the ALS is greater than a second predetermined value, determining that the first sensor reading is not sufficient to determine an indoor/outdoor state of the device.

47. The apparatus of claim 46, the apparatus further comprising:
   responsive to determining that the first sensor reading or the camera image is sufficient to determine an indoor/outdoor state of the device, means for gating off the at least one first sensor and update the indoor/outdoor state of the device based on the first sensor reading or the camera image.

48. The apparatus of claim 41, wherein the at least one second sensor comprises an always-on motion classifier and the apparatus further comprising:
   means for determining change in movement by the always-on motion classifier;
   means for classifying the change in movement as indicative of a change in the indoor/outdoor state; and
   means for using the camera to capture the camera image based on the determination of the motion classifier.

49. The apparatus of claim 48, wherein the change in movement resulting from the mobile device being inside a train or a vehicle in motion is not classified as being indicative of a change in the indoor/outdoor state.

50. The apparatus of claim 41, wherein the at least one second sensor comprises a motion detector, the apparatus further comprising:
   means for, responsive to determining that the first sensor reading indicates movement of the device and a determination that the mobile device is in use, using the camera to generate the reading indicative of the indoor/outdoor state of the mobile device.

51. The apparatus of claim 41, wherein the plurality of possible states includes an unknown state.

52. The apparatus of claim 41, wherein the at least one first sensor includes at least one of:

a GPS receiver;
a WLAN receiver;
an audio receiver;
a Bluetooth receiver; and
a cellular receiver.

53. The apparatus of claim 41, wherein the at least one second sensor includes at least one of:
an accelerometer;
a motion detector;
a clock;
an ambient light sensor;
a weather sensor; and
a temperature sensor.

* * * * *